United States Patent Office 3,452,773
Patented July 1, 1969

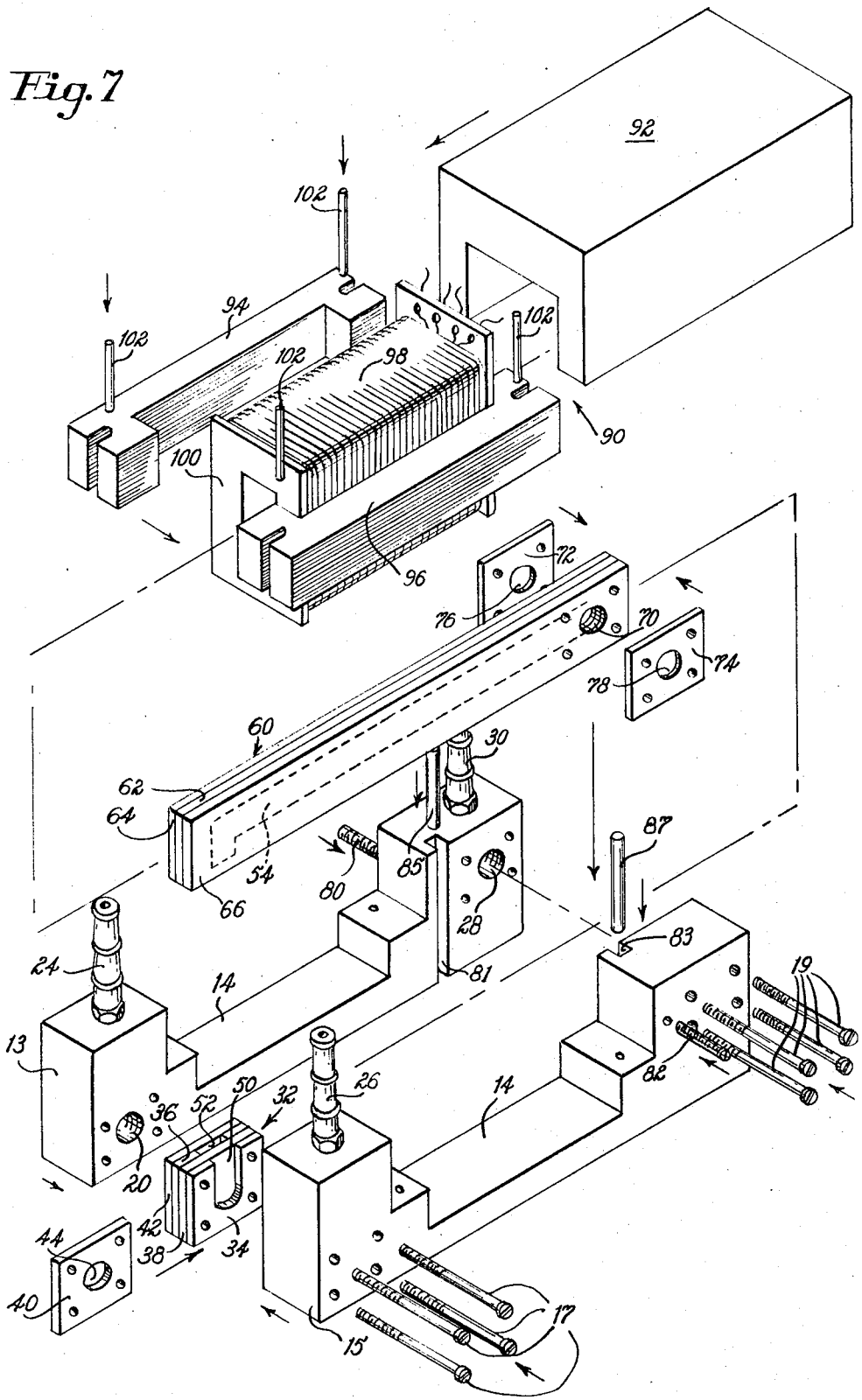

3,452,773
LAMINATED VALVE STRUCTURE
James Melvin Denker, Scituate, Mass., assignor to Instron Corporation, Canton, Mass., a corporation of Massachusetts
Filed Nov. 2, 1966, Ser. No. 591,644
Int. Cl. F15c 3/14; G05g 19/00; G05b 6/02
U.S. Cl. 137—83
9 Claims

ABSTRACT OF THE DISCLOSURE

An elongated flexible beam of at least three laminations fixed at one end with an interior lamination relieved through its thickness to define adjacent the other end a port the axis of which is perpendicular to the direction of flexation of the beam, and a valve of two relatively movable members each of at least three laminations and having at least one lamination of each member relieved through the thickness thereof.

---

This invention relates to valves.

Primary objects of the invention are to provide a reliable, low inertia, very sensitive valve with ports of highly accurate size and alignment (useful, e.g., in servo loops for transforming an electrical signal into fluid action), at low cost.

The invention features a port construction in which an interior one of at least three laminations is relieved through its thickness to define a port the axis of which is parallel to the laminations. There is also featured a valve in which a stationary ported member is disposed adjacent an elongated flexible ported member having an internal fluid passage along its major axis communicating with its port, the elongated member being arranged for flexing movement to vary the relative alignment of its port with the porting of the stationary member. In preferred embodiments, the stationary and flexible members employ the laminated port construction; the stationary member has five laminations with two internal layers so relieved to provide a pair of ports; and a magnetic torque motor is provided to flex the flexible member.

Figure 1:
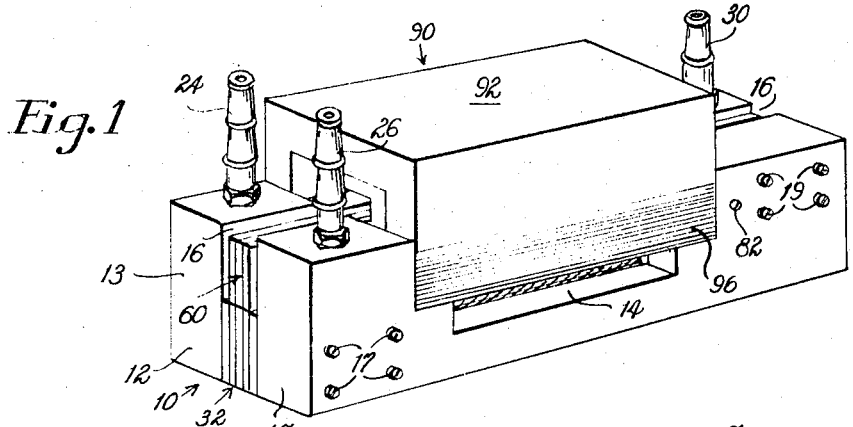
Figure 2:
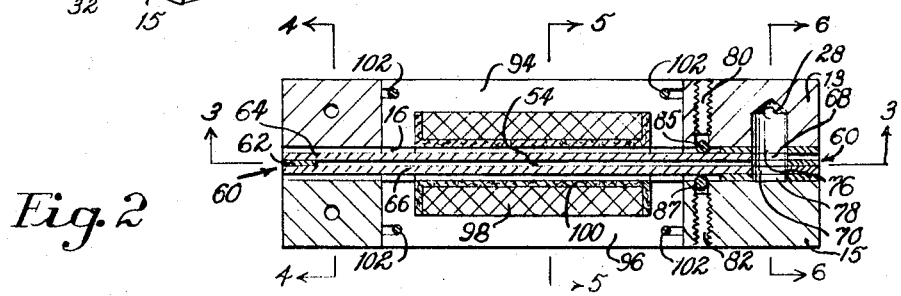
Figure 3:
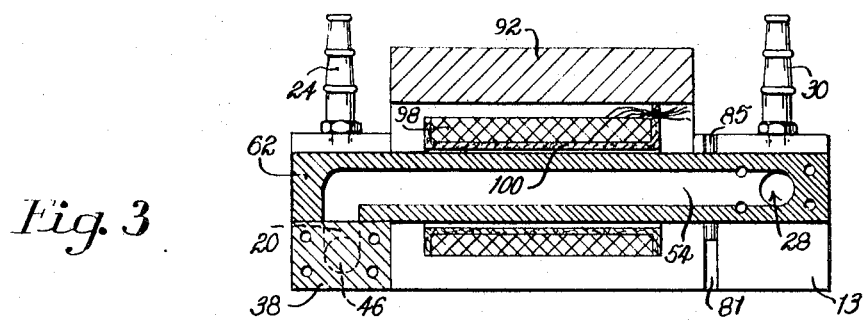
Figure 4:
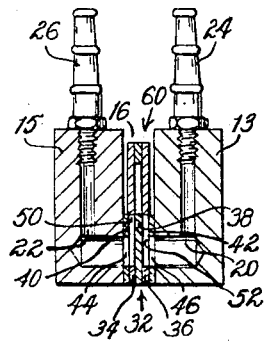
Figure 5:
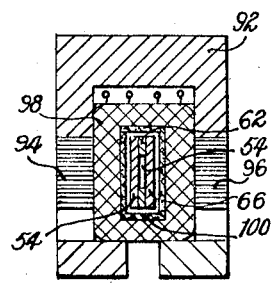
Figure 6:
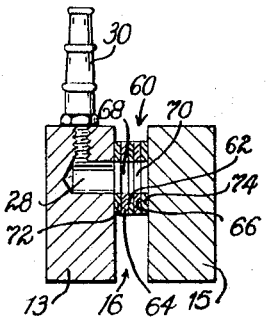

Other objects, features, and advantages will appear from the following description of a preferred embodiment of the invention, taken together with the attached drawings thereof, in which:

FIG. 1 is a perspective view of the valve of the invention;
FIG. 2 is a horizontal section of the valve;
FIG. 3 is a section taken along 3—3 of FIG. 2;
FIG. 4 is a section taken along 4—4 of FIG. 2;
FIG. 5 is a section taken along 5—5 of FIG. 2;
FIG. 6 is a section taken along 6—6 of FIG. 2; and
FIG. 7 is an exploded view of the valve.

Main body 12 of valve 10 has two allochiral portions 13 and 15 bolted together at 17 and 19 but spaced apart to leave vertical slot 16 of rectangular cross-section, and additionally has a stepped central recess 14. Symmetrically arranged air exit passages 20, 22 extend at the forward end of the valve from the opposing side walls of slot 16 outwardly and upwardly through the adjacent portions of body 12 to air couplings 24, 26. Air input passage 28 extends in the rearward end of body portion 13 from the wall of slot 16 outwardly and upwardly to air coupling 30.

Stationary port plate 32 is secured at the bottom of the forward end of slot 16 and is made of five laminations of .015″ hardened and ground shim stock, bolted together by bolts 17. Interior layers 34 and are vertically sloted to define ports 50 and 52 and are separated by solid layer 38. Outer layers 40 and 42 have openings 44 and 46 respectively, communicating at one end with ports 50, 52, and at the other end with passages 20, 22.

Flexible elongated valve beam 60 is mounted stationary at its rearward end in slot 16 and at its forward end has its bottom surface in sliding contact with the top surface of port plate 32. Beam 60 has three laminations of .015″ shim stock, bolted together by bolts 19, interior layer 62 being slotted to provide L-shaped air passage 54 opening downwardly into communication with plate 32. Outer layers 64 and 66 provide the side walls of passage 54 and have openings 68 and 70 communicating with the rearward end of passage 54. Spacer laminations 72 and 74, identical to laminations 40 and 42, are disposed in slot 16 adjacent layers 64 and 66, their openings 76 and 78 aligned with openings 68 and 70. Air inlet passage 28 communicates with passage 54 through openings 68 and 76. Null balance screws 80, 82 are disposed in body 12 at opposite sides of beam 60 just forward of spacers 72, 74, and extend respectively into vertical grooves 81, 83 in body 12. Pins 85, 87 are located loosely in grooves 81, 83 and provide mechanical coupling between screws 80, 82 and the opposite sides of beam 60.

Torque motor 90 is mounted in recess 14 of valve body 12 and includes permanent channel magnet 92 disposed above beam 60, laminated low hysteresis C-shaped pole extension pieces 94, 96 (of hypernic transformer core stock) extending from magnet 92 downwardly adjacent and spaced from opposite sides of beam 60, and bi-filar wound (on cardboard form 100) coil 98 surrounding beam 60. The laminations of pieces 94, 96 are aligned with studs 102.

In operation an air supply is introduced through coupling 30. Screws 80, 82 are adjusted so that in the absence of an electric current in coil 98, air passage 54 is aligned with central layer 38 of port plate 32; any air leakage is thus equally distributed to ports 50 and 52. The passage of an electric current through coil 98 magnetizes beam 60 causing it to deflect laterally toward one of the pole pieces 94, 96 (depending upon the direction of the current) and into contact with a side wall of slot 16, thereby aligning passage 54 with either port 50 or 52 and producing air flow through either coupling 24 or 26. When connected in an error correcting servo loop, valve 10 thus can convert an electrical error signal into pneumatic or hydraulic corrective action. The laminated port construction provides accurately and identically sized ports. The flexible mounting and low inertia of beam 60 gives a very flat response.

What is claimed is:
1. A valve including two relatively movable members each comprising at least three laminations, at least one lamination of each member being relieved through the full thickness thereof to define a port having its axis parallel to said laminations, said relieved laminations being of equal thickness and said ports being movable into and out of alignment with each other.

2. The valve of claim 1 wherein said laminations in both said members are of equal thickness shim stock.

3. A valve comprising a stationary port plate and elongated flexible beam having a fluid passage therethrough parallel to its major axis, said beam being mounted with one end fixed and a surface spaced from said end closely adjacent said plate with said passage opening through said surface, said surface being movable over said plate upon flexing of said beam to bring said passage into and out of alignment with porting in said plate, said port plate and said beam each comprising at least three laminations, a central one of said port plate laminations being solid and the two laminations of said port plate adjacent said central lamination being relieved through the thickness thereof to define said porting, and a central lamination of said beam being relieved through the thickness thereof to define said passage.

4. The valve of claim 3 including a main valve body and wherein said port plate comprises five laminations, a central one of which is solid, the two interior laminations adjacent said central one having full thickness slots, and the two laminations adjacent said slotted laminations having full thickness openings communicating respectively at one end with said slots and at the other end with fluid exit passages in said main valve body, said passage communicates at the fixed end of said beam with a fluid inlet passage in said main body, said beam having a first position in which said passage therethrough is aligned with said solid lamination of said plate and second and third positions in which said passage therethrough is aligned, respectively, with said slots through said interior laminations of said port plate.

5. The valve of claim 4 wherein a magnetic torque motor is mounted on said main valve body to flex said beam between its said positions, said motor comprising a permanent magnet, a pair of laminated pole piece extensions disposed at opposite sides of said beam, and a coil surrounding said beam.

6. The valve of claim 3 wherein said laminations are of equal thickness.

7. An elongated flexible valving member having a fluid passage extending therethrough and opening through a planar surface which is parallel to the major axis of said member to provide at said surface a port having an axis perpendicular to said surface and said major axis, said member being fixed at the end thereof most distant from said port for flexation in planes parallel to said surface and comprising three laminations parallel to said axes, the central one of said laminations being relieved through the thickness thereof to define said passage.

8. A valve including the valving member of claim 7 and a stationary port plate having at a planar surface thereof porting whose axis is perpendicular to said surface, said port plate being mounted closely adjacent said member with said planar surfaces parallel, said surface of said member being movable over said surface of said plate upon flexing of said member to bring said port of said member and said porting into and out of alignment, and said axes of said port of said member and said porting being parallel throughout said flexing of said member.

9. The valve of claim 8 wherein said port plate comprises at least three laminations, a central one of said port plate laminations being solid and the two laminations of said port plate adjacent said central port plate lamination being relieved through the thickness thereof to define said porting, and said relieved laminations of said member and said port plate are of equal thickness.

References Cited

UNITED STATES PATENTS

| | | | |
|---|---|---|---|
| 2,807,280 | 9/1957 | Kittredge | 251—304 X |
| 2,990,839 | 7/1961 | Ray | 137—83 X |
| 3,215,162 | 11/1965 | Carver | 251—141 X |
| 3,290,997 | 12/1966 | Jerome et al. | 137—83 |

ROBERT W. MICHELL, *Primary Examiner.*

L. G. MACHLIN, *Assistant Examiner.*

U.S. Cl. X.R.

91—3; 251—139